US012236505B2

(12) United States Patent
Kenyon-Dean et al.

(10) Patent No.: US 12,236,505 B2
(45) Date of Patent: Feb. 25, 2025

(54) SYSTEMS AND METHODS FOR GENERATING FLOOD HAZARD ESTIMATION USING MACHINE LEARNING MODEL AND SATELLITE DATA

(71) Applicant: BANK OF MONTREAL, Toronto (CA)

(72) Inventors: Kian Kenyon-Dean, Toronto (CA); Bo Zhao, Toronto (CA); Keyvan Kasiri, Toronto (CA); Yevgeniy Vahlis, Toronto (CA); Todd Fraser, Toronto (CA); Lyndsay Morrison, Toronto (CA); Michael Torrance, Toronto (CA); Stella Wu, Toronto (CA)

(73) Assignee: BANK OF MONTREAL, Toronto (CA)

( * ) Notice: Subject to any disclaimer, the term of this patent is extended or adjusted under 35 U.S.C. 154(b) by 312 days.

(21) Appl. No.: 17/493,788

(22) Filed: Oct. 4, 2021

(65) Prior Publication Data

US 2022/0108504 A1    Apr. 7, 2022

Related U.S. Application Data

(60) Provisional application No. 63/087,505, filed on Oct. 5, 2020.

(51) Int. Cl.
*G06T 11/40* (2006.01)
*G06N 3/045* (2023.01)
(Continued)

(52) U.S. Cl.
CPC ............. *G06T 11/40* (2013.01); *G06N 3/045* (2023.01); *G06N 3/088* (2013.01); *G06T 7/40* (2013.01);
(Continued)

(58) Field of Classification Search
CPC . G06T 11/40; G06T 7/40; G06T 2207/10032; G06T 2207/20084;
(Continued)

(56) References Cited

U.S. PATENT DOCUMENTS 7,917,292 B1    3/2011  Du
9,213,994 B2   12/2015  Green et al.
(Continued)

FOREIGN PATENT DOCUMENTS

AU    2005259747 B2    1/2006
CN      104898183 B    10/2017
(Continued)

OTHER PUBLICATIONS

Flood Hazard Risk Mapping, Esfandiari et al., Oct. 1, 2020 (Year: 2020).*

(Continued)

*Primary Examiner* — Jianxun Yang
(74) *Attorney, Agent, or Firm* — Foley & Lardner LLP

(57) ABSTRACT

A system and method for flood hazard estimation inputs a satellite elevation map and applies a machine learning model to output a geographic map representing flood hazard areas. The machine learning model is trained using a generative adversarial network (GAN) to produce an output of a deterministic hazard mapping algorithm. A GAN objective applies a loss function, reweighted to increase the importance of high hazard areas. The method retrieves a DEM topography file representing elevation data of an identified terrain, and applies a sink-filling algorithm to detect and fill sinks in the DEM topography. The algorithm subtracts the DEM elevation data to generate a filled topography, and identifies flattest regions of the filled topography. The algorithm then generates a flood hazard map by merging the filled topography and the DEM elevation data, using a (Continued)

weighting function that balances the detected sinks and the flattest regions of the filled topography.

20 Claims, 10 Drawing Sheets

(51) Int. Cl.
  *G06N 3/088*   (2023.01)
  *G06T 7/40*    (2017.01)
  *G06V 10/94*   (2022.01)
  *G06V 30/422*  (2022.01)

(52) U.S. Cl.
  CPC ............ *G06V 10/95* (2022.01); *G06V 30/422* (2022.01); *G06T 2207/10032* (2013.01); *G06T 2207/20084* (2013.01)

(58) Field of Classification Search
  CPC ............... G06T 7/0004; G06T 2200/04; G06T 2207/10028; G06T 2207/20081; G06T 2207/30181; G06T 2207/30192; G06F 18/213; G06N 3/045; G06N 3/088; G06V 10/95; G06V 30/422; G06V 10/7784; G06V 10/82; G06V 20/13; Y02A 10/40
  See application file for complete search history.

(56) References Cited

U.S. PATENT DOCUMENTS

| | | | |
|---|---|---|---|
| 9,952,353 | B2 | 4/2018 | Eickelman et al. |
| 10,147,057 | B2 | 12/2018 | Zhang et al. |
| 10,664,937 | B2 | 5/2020 | Wani et al. |
| 2014/0156232 | A1 | 6/2014 | Cordazzo et al. |
| 2021/0178274 | A1* | 6/2021 | St-Pierre ............ A63F 13/50 |
| 2021/0248765 | A1* | 8/2021 | Zhang ................ G06T 7/55 |
| 2022/0084204 | A1* | 3/2022 | Li ..................... G06N 3/08 |
| 2022/0108504 | A1 | 4/2022 | Kenyon-Dean et al. |

FOREIGN PATENT DOCUMENTS

| | | |
|---|---|---|
| CN | 111445087 A | 7/2020 |
| JP | 4082686 | 2/2008 |
| KR | 101816184 | 1/2018 |

OTHER PUBLICATIONS

"Attribution of extreme weather events in the context of climate change", National Academies of Sciences Engineering & Medicine & others NASEM, National Academies Press, 2016, (163 pages).
"High Resolution Digital Elevation Model (HRDEM)—CanElevation Series", Government of Canada, Natural Resources Canada, Aug. 2019, retrieved Oct. 13, 2021 from URL: https://open.canada.ca/data/en/dataset/957782bf-847c-4644-a757-e383c0057995 (22 pages).
"Focus on Flood mapping in Canada. Institute for Catastrophic Loss Reduction", Institute for Catastrophic Loss Reduction, Western University, 2019, pp. 1-14 (9 pages).
Abebe et al., "Assessing urban areas vulnerability to pluvial flooding using GIS applications and Bayesian Belief Network model", Journal of Cleaner Production, vol. 174, Feb. 10, 2018, pp. 1629-1641 (13 pages).
Armenakis et al., "Flood risk assessment in urban areas based on spatial analytics and social factors", Geosciences, vol. 7, No. 123, Nov. 22, 2017, pp. 168 (15 pages).
Armenakis et al., "Flood Risk Mapping for the City of Toronto", Procedia Economics and Finance, Sep. 2014 (7 pages).
Barnes et al., "Priority-flood: An optimal depression-filling and watershed-labeling algorithm for digital elevation models", Computers & Geosciences, vol. 62, No. 203, Jan. 2014, pp. 117-127 (17 pages).
Feltmate et al., "Climate Change and the Preparedness of Canadian Provinces and Territories to Limit Flood Risk", Intact Centre on Climate Adaptation, University of Waterloo, 2020 (102 pages).
Gebrehiwot et al., "Deep Convolutional Neural Network for Flood Extent Mapping Using Unmanned Aerial Vehicles Data," Sensors, vol. 19, No. 7, Mar. 27, 2019, pp. 1486 (13 pages).
Isola et al., "Image-to-image translation with conditional adversarial networks," CVPR, 2017 (10 pages).
Li et al., "Urban flood mapping with an active self-learning convolutional neural network based on TerraSAR-X intensity and interferometric coherence", ISPRS Journal of Photogrammetry and Remote Sensing, vol. 152, Jun. 2019, pp. 178-191 (14 pages).
Long et al., "Fully convolutional networks for semantic segmentation", Proceedings of the IEEE conference on computer vision and pattern recognition, 2015, pp. 3431-3440 (10 pages).
Lugeri et al., "River flood risk and adaptation in Europe—assessment of the present status", Mitigation and Adaptation Strategies for Global Change, vol. 15, 2010, pp. 621-639 (19 pages).
Mann et al., "Influence of Anthropogenic Climate Change on Planetary Wave Resonance and Extreme Weather Events", Scientific Reports, Mar. 27, 2017 (12 pages).
Mosavi et al., "Flood Prediction Using Machine Learning Models: Literature Review", Water, vol. 10, No. 11, 2018, pp. 1536, doi: 10.3390/w10111536 (40 pages).
Noyamee et al., "Urban pluvial flood forecasting using open data with machine learning techniques in Pattani basin", Procedia computer science, vol. 165, No. 119, Dec. 2017, pp. 288-297 (10 pages).
Rincon et al., "Flood Risk Mapping Using GIS and Multi-Criteria Analysis: A Greater Toronto Area Case Study", Geosciences, vol. 8, No. 8, Jul. 27, 2018, pp. 275 (27 pages).
Ronneberger et al., "U-net: Convolutional networks for biomedical image segmentation", International Conference on Medical image computing and Computer assisted Intervention, May 18, 2015, pp. 234-241, Springer (8 pages).
Sangkloy et al., "Scribbler: Controlling deep image synthesis with Sketch and Color", 2017 IEEE Conference on Computer Vision and Pattern Recognition (CVPR), pp. 6836-6845 (10 pages).
Sit et al., "Decentralized flood forecasting using deep neural networks," arXiv:1902.02308, Feb. 2019 (7 pages).
Stott, Peter, "How climate change affects extreme weather events", Science, vol. 352, No. 6293, pp. 1517-1518, 148 (3 pages).
Wang et al., "High resolution image synthesis and semantic manipulation with conditional GANs", Proceedings of the IEEE conference on computer vision and pattern recognition, Aug. 20, 2018, pp. 8798-8807 (14 pages).
Xie et al., "Holistically-nested edge detection", Proceedings of the IEEE international conference on computer vision, Oct. 4, 2015, pp. 1395-1403 (10 pages).
Zahmatkesh et al., "An overview of river flood forecasting procedures in Canadian watersheds", Canadian Water Resources Journal/Revue Canadienne des ressources hydriques, vol. 44, No. 3, Mar. 18, 2019, pp. 213-229 (18 pages).
Zhu et al., "Unpaired Image-to-Image translation using cycle-consistent adversarial networks", Computer Vision (ICCV), 2017 IEEE International Conference on Computer Vision, Oct. 22-29, 2017 (18 pages).
Second Examiner's Requisition on CA App. 3,132,606 dated Oct. 19, 2023 (4 pages).
Esfandiari et al., "Flood Hazard Risk Mapping Using a Pseudo Supervised Random Forest", Remote Sens., 12(19):3206, Sep. 26, 2020 (Sep. 26, 2020).
First Office Action on Canadian Appl. Ser. No. 3,132,706 dated Dec. 29, 2022 (5 pages).
Pham et al., "GIS Based Hybrid Computational Approaches for Flash Flood Susceptibility Assessment", Water, 12(3):683, Mar. 12, 2020 (Dec. 3, 2020).
Foreign Action other than Search Report on CA Dtd Aug. 6, 2024.

* cited by examiner

SYSTEMS AND METHODS FOR GENERATING FLOOD HAZARD ESTIMATION USING MACHINE LEARNING MODEL AND SATELLITE DATA

CROSS-REFERENCE TO RELATED APPLICATION

The present application claims benefit of U.S. Provisional App. No. 63/087,505, filed Oct. 5, 2020, which is incorporated by reference in its entirety.

TECHNICAL FIELD

This application relates generally to generating a flood hazard estimation using a machine learning model and satellite data.

BACKGROUND

By many accounts, flooding is the most costly type of natural disaster. For example, 2013 Toronto floods caused over $1 billion in property damage. As climate change continues to grow in impact, it is expected that extreme weather events including flooding will increase in frequency. In many geographic locations including Ontario, Canada, pluvial flooding is the most common type of flooding event. Pluvial flooding is characterized by the inundation of the urban environment as a result of rainfall overwhelming storm water management systems. Compared to fluvial flooding (associated with watercourse or river overflows) and coastal flooding (associated with lake or ocean overflows), many territories and municipalities may be least prepared to handle pluvial flooding.

Storm driven floods along major rivers and their tributaries have resulted in loss of life and billions of dollars in damages, as well as lost productivity to thousands of homes, farms, and businesses. As climate change progresses, severe weather events that may cause devastating flooding may more frequent. Billions of dollars per year is spent on flood claims to governmental agencies and to private insurance, which increases costs for everyone and does not solve the existing problem. Related costs for repair and often substandard insurance products sold to potential flood victims amounts to a negative economic cash flow that affords only limited ex post facto relief.

Up-to-date, high quality flood maps are essential for informed urban planning, flood preparation, mitigation, and flood response efforts. Software applications are capable of generating geographic maps for various end uses. For example, geographic map information may include satellite images, political boundaries, topography, climate and weather conditions, hazards such as risks of flood, fire, and seismic events, and so forth. What is needed is technology that addresses the problem of flooding before the event, as opposed to measures after a flood event has ravaged an area.

SUMMARY

What is needed is systems and methods that provide improved geographic mapping methods for flood hazard estimation that draw from publically available data sources. What is needed is high quality flood hazard maps suitable for informed urban planning, flood preparation, mitigation, and flood response.

In various embodiments, a system and method of geographic mapping for flood hazard estimation retrieves a digital elevation model (DEM) topography file representing elevation data of an identified terrain. The system and method applies a sink-filling algorithm to the DEM topography file to detect and fill sinks in the DEM topography. The geographic mapping method subtracts the DEM elevation data to generate a filled topography file, and analyzes the filled topography file to identify flattest regions of the filled topography file. The method then generates a flood hazard map file by merging the filled topography file and the DEM elevation data while applying a weighting function. The weighting function balances the detected sinks in the DEM topography and the flattest regions of the filled topography file.

In one embodiment, a computer-implemented method comprises inputting, by a computer, a satellite elevation map; applying, by the computer, a machine learning model that is trained using a generative adversarial network to produce an output of a deterministic hazard mapping algorithm; and outputting, by the computer, a map representing flood hazard areas.

The generative adversarial network may comprises a deep learning convolutional neural network trained to abstract the satellite elevation map to a flooding-related feature map.

In an embodiment, the map representing flood hazard areas identifies geographic areas most vulnerable to pluvial flooding.

In various embodiments, the generative adversarial network includes an objective function, wherein a generator (G) of the generative adversarial network tries to minimize the objective function against an adversarial (D) of the generative adversarial network that tries to maximize the objective function in training the machine learning model. The objective function of the generative adversarial network may include a reconstruction loss with a weighting mechanism that increases importance of high hazard areas. In an embodiment, the reconstruction loss comprises an L1 loss function, reweighted to increase the importance of the high hazard areas. In an embodiment, the L1 loss function is reweighted via the weighting factor w in the formula $w=2.5y+2.5$, clamped between 0.02 and 1.

In various embodiments, the generative adversarial network comprises a deep learning neural network, wherein the satellite elevation map is a digital elevation model (DEM) topography representing elevation data of an identified terrain, wherein the deep learning neural network applies the deterministic hazard mapping algorithm to the DEM topography to detect and fill sinks in the DEM topography. The deep learning neural network may further apply the deterministic hazard mapping algorithm to subtract the elevation data of the DEM topography to generate a hidden layer representing a filled topography map and to identify flattest regions of the hidden layer representing the filled topography map.

The deep learning neural network may further apply the deterministic hazard mapping algorithm in an output layer of the deep learning neural network merging the hidden layer representing the filled topography map and the DEM topography representing the elevation data of the identified terrain. In an embodiment, merging the hidden layer representing the filled topography map and the DEM topography generates a weighted combination of the filled topography map and the DEM topography balancing the identified flattest regions of the filled topography map versus the detected sinks in the DEM topography.

In another embodiment, a computer-implemented method comprises retrieving, by the computer, a DEM topography file representing elevation data of an identified terrain;

applying a sink-filling algorithm to the DEM topography file, wherein the sink-filling algorithm detects and fills sinks in the DEM topography file; and subtracting the elevation data of the DEM topography file to generate a filled topography file; analyzing, by the computer, the filled topography file to identify flattest regions of the filled topography file; and generating, by the computer, a flood hazard map file by applying a weighting function in merging the filled topography file and the DEM elevation data, wherein the weighting function balances the detected sinks in the DEM elevation data and the flattest regions of the filled topography file.

In a further embodiment, a system comprises a server comprising a processor and a non-transitory computer-readable medium containing instructions that when executed by the processor causes the processor to perform operations comprising: input a satellite elevation map; apply a machine learning model this is trained using a generative adversarial network to produce an output of a deterministic hazard mapping algorithm; and output a map representing flood hazard areas.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
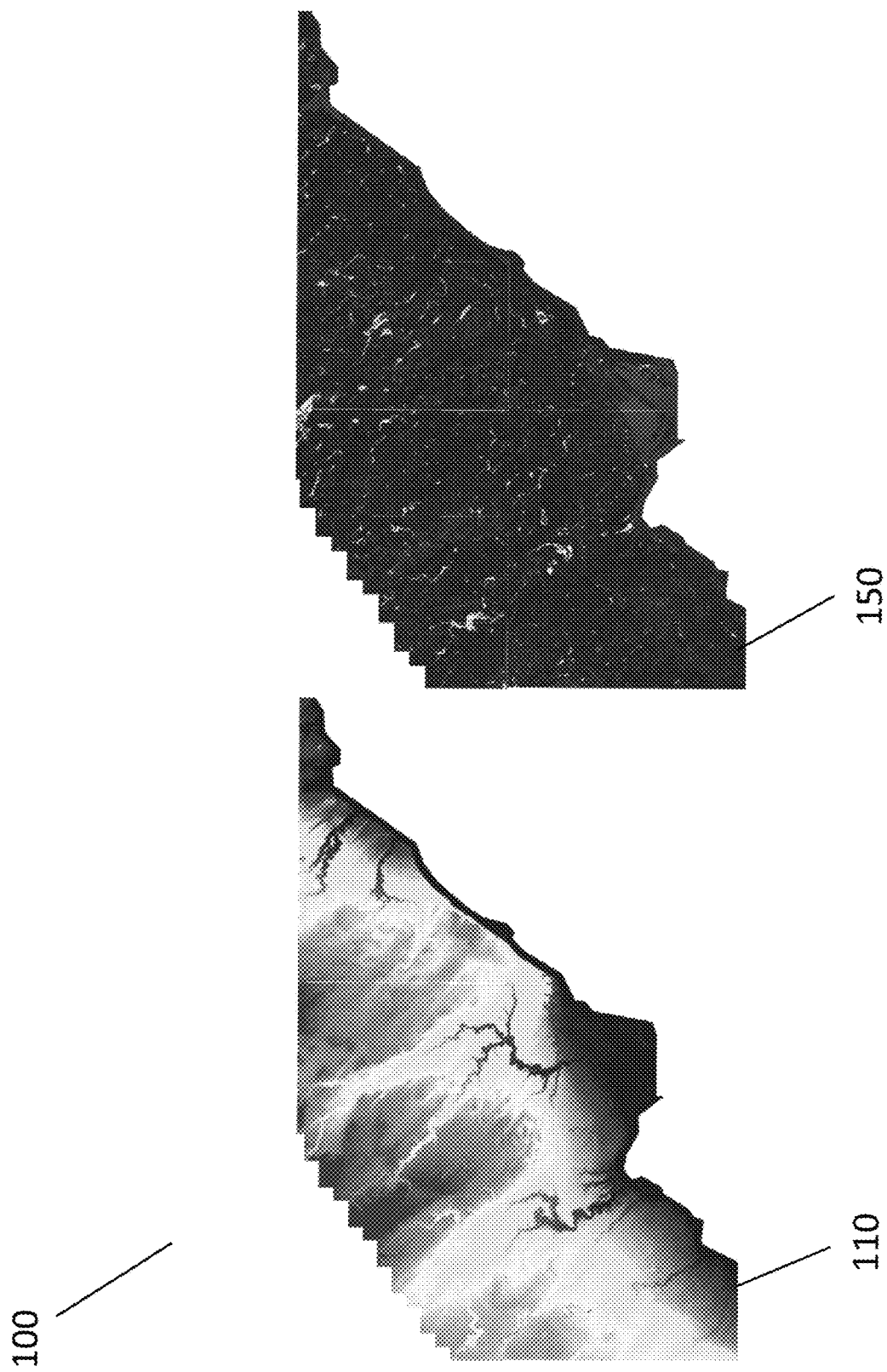
FIG. 1 are representative views of input and output terrain maps of a deep image translation model for flood hazard estimation, showing a DEM of the greater Toronto area and a flood hazard map predicted by a deterministic algorithm, according to an embodiment.

References will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Embodiments disclosed herein apply an innovative approach to flood hazard mapping that combines current publicly available satellite data with deep image translation technology. Flood mapping is critical to determine which regions in a given topography are most susceptible to flooding, e.g., in the event of severe weather. As climate change progresses, such severe weather events will become more frequent.

DEMs are standard types of elevation maps used in flood mapping. In various embodiments, the present systems and methods use a Digital Terrain Model (DTM) as the DEM. A DTM provides elevation levels of the topography excluding structures and vegetation. Illustrative embodiments predict urban flood hazard within the greater Toronto area (GTA), but the present techniques can be applied to any DEM.

In various embodiments, improved flood hazard estimation technologies of the present disclosure can enable researchers, urban planners, and industry experts to find areas that may be prone to flooding that would otherwise be missed by conventional approaches. This also can benefit homeowners by helping them to decide whether or not they should pursue more comprehensive flood mitigation measures for their homes. The present technology also can give planners, insurers, and mortgage providers a better view of flood risks associated with given geographical regions.

A useful resource for flood mapping and other climate modelling problems is publically available satellite data released by government and non-governmental organizations. For example, Natural Resources Canada (NRCan) recently released a very large dataset of high resolution LIDAR satellite data covering over 100,000 square kilometers of Canada, including most major cities such as the greater Toronto area Embodiments disclosed herein incorporate a flood hazard mapping model that combines NRCan satellite data with established flood mapping practices. A deep image translation model takes as input a DEM of a topography for an identified terrain, and is trained to output a hazard map produced by a deterministic flood hazard mapping algorithm. In generating a flood hazard map method, the method incorporates a novel weighting mechanism into the reconstruction loss to increase importance of high-hazard areas.

Applicants have evaluated model generalization on regions unseen during training, and found that the model can reproduce the target outputs and detect new flood hazard areas that were missed by a conventional algorithm. In illustrative embodiments, the deep image translation model also provides a flooding-oriented feature map of the topography in a central hidden layer. These representations can be used in generating downstream climate models.

The present system and method employ technologies at the intersection of flood modelling and deep learning in treating flood mapping as a problem for deep image translation. Image translation learns a mapping between two image distributions, such as generating photographs from sketches. Historically, image translation has applied per-pixel classification or regression techniques. More recent image translation developments have adopted adversarial learning for image-to-image translation. Such adversarial methods can be effective at synthesizing photos from label maps, reconstructing objects from edge maps, and colorizing images, among other tasks.

FIG. 1 shows representative views of input and output terrain maps 100 of a deep image translation model for flood hazard estimation, including a DEM of the greater Toronto area and a flood hazard map predicted by a deterministic algorithm. Given the topography's DEM as input (matrix 110, FIG. 1), the model is trained to produce the output of a deterministic hazard mapping algorithm (target 150, FIG. 1). In the map 110, a warmer color represents higher elevation levels. In the map 150, a warmer color represents a higher predicted flood hazard.

Figure 5:
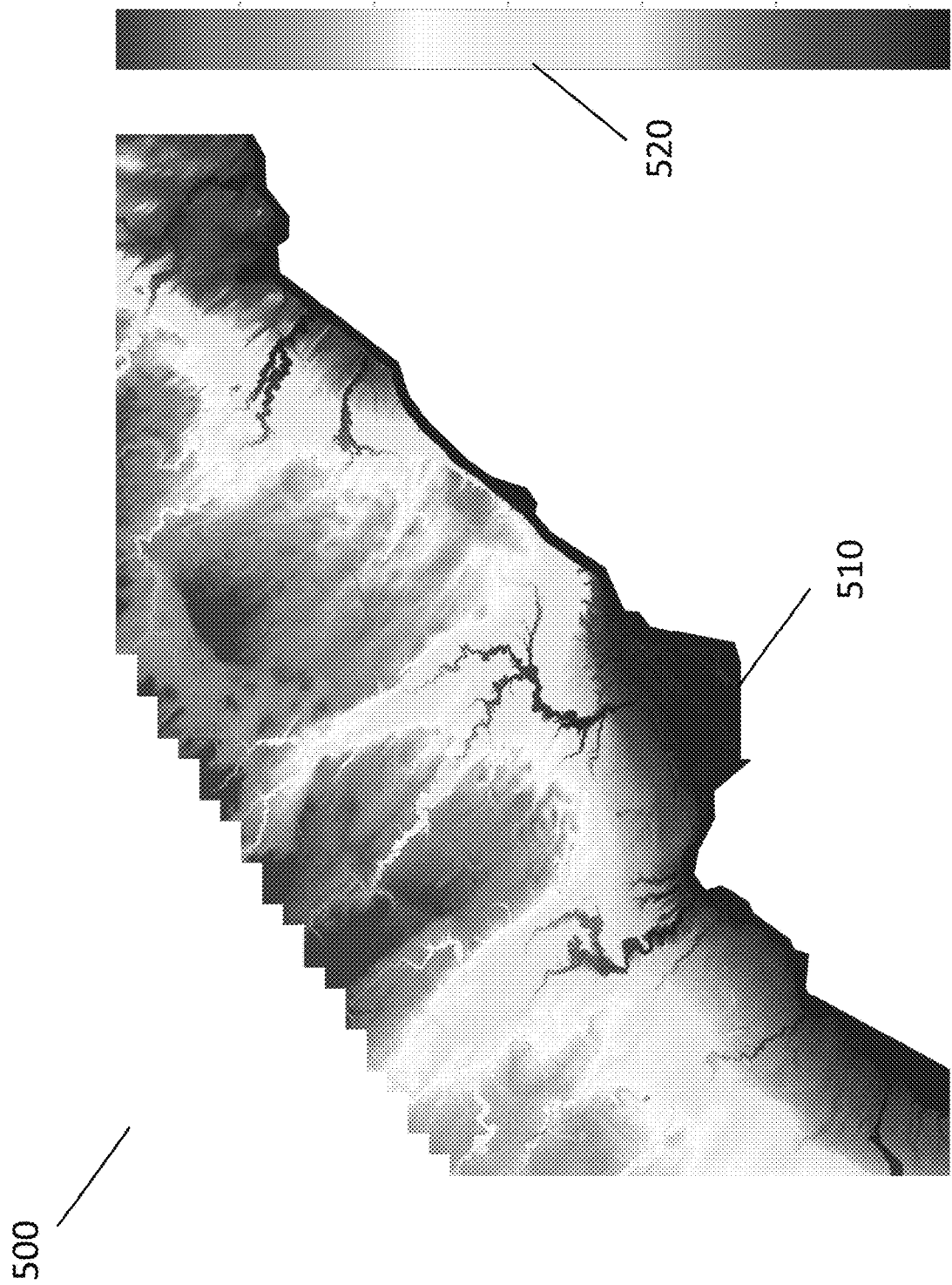
FIG. 5 is a representative view of a DEM of the topography of a mapped terrain, according to an embodiment.

Map 500 of FIG. 5 shows a DEM 510 of the GTA with a color scale 520 in which a warmer color represents higher elevation levels.

Various embodiments employ leverage LIDAR satellite data obtained from NRCan. In an embodiment, a study on flood mapping focuses on the greater Toronto area (GTA). In an embodiment, the techniques are scaled to the entire Canadian landscape covered by the NRCan dataset. In an illustrative embodiment, the NRCan data was retrieved as 10 km² square TIFF 64-bit images, and 16 of these images were stitched together to obtain the DEM of the GTA (matrix 110, FIG. 1).

Figure 2:
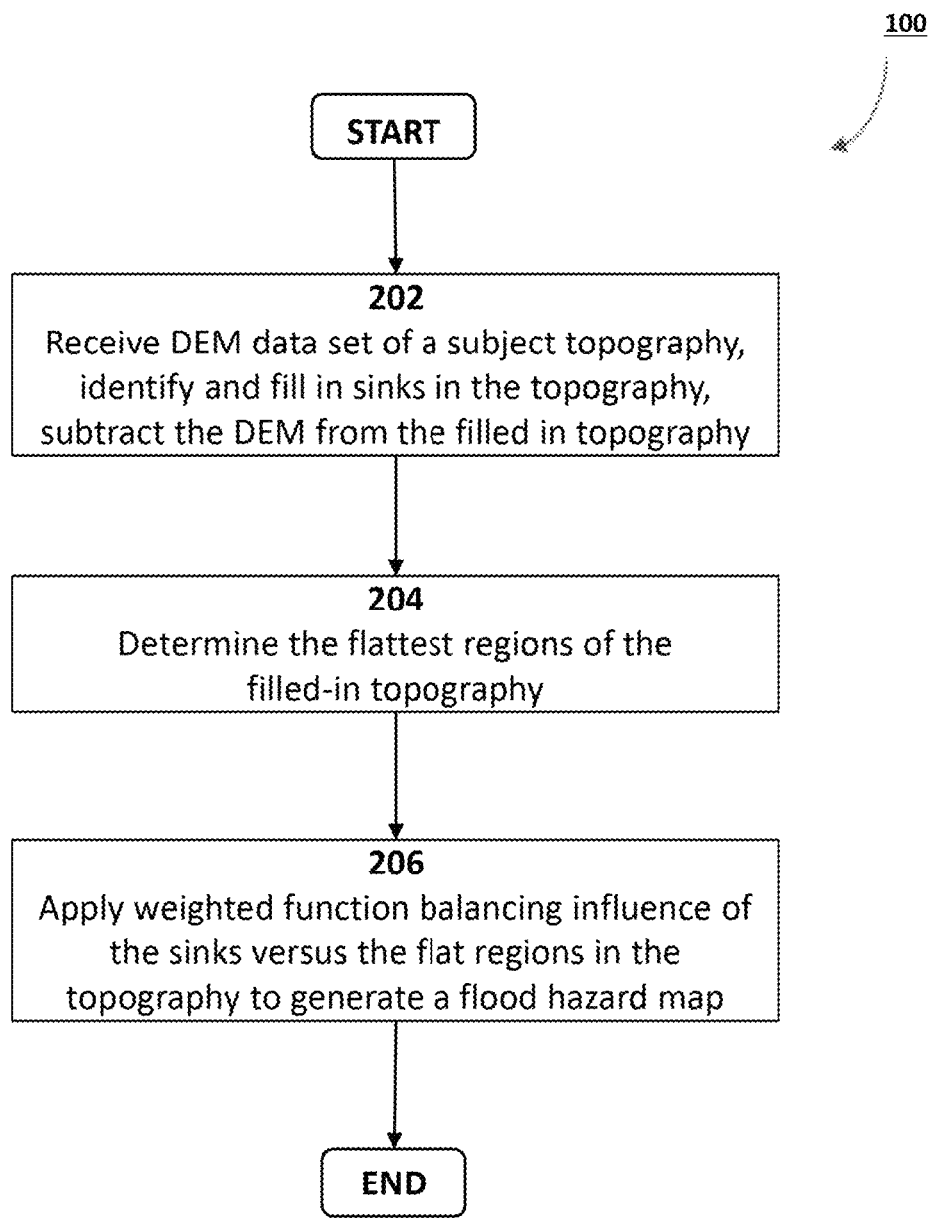
FIG. 2 is a flow chart diagram of a deep image translation process for flood hazard estimation, according to an embodiment.

As shown in the flow chart diagram of FIG. 2, a flood hazard mapping technique 200 employs deterministic flood hazard estimation to create target data for the present deep image translation model. At step 202, the method retrieves a DEM file representing elevation data of an identified terrain. At step 202 the method applies a sink-filling algorithm to the DEM topography file to detect and fill sinks in the DEM topography. The geographic mapping method subtracts the DEM elevation data to generate a filled topography file. At step 204, the method analyzes the filled topography file to identify flattest regions of the filled topography file. At step 206, the method generates a flood hazard map file by merging the filled topography file and the DEM elevation data while applying a weighting function. The weighting function balances the detected sinks in the DEM topography and the flattest regions of the filled topography file.

The method 200 balances the influence of sinks in the topography versus the flat regions. Applicants have observed that the resulting map can provide a more reliable indication of flood hazard in that the flattest areas at the bottom of inundated regions are often the most vulnerable to pluvial flooding in the event of severe rainstorms. In an embodiment, this technique does not consider the width of an existing outlet, and if there is a sink in the topography with just a one-pixel wide outlet it may go undetected. In an embodiment, input data only incorporates terrain elevation levels. In other embodiments, input data can incorporate existing sewer systems, structural information, land use, soil type layers into the map. This additional data can be available from local or municipal sources, among other possibilities.

In an example, the method 200 used a sink-filling algorithm to find and fill in the sinks in the topography. This algorithm used a dynamic program to detect the sinks or depressions in the DEM that are inwardly-draining and have no outlet to flow out to the edge of the map. The algorithm will fill the sinks up to the level of their lowest outlet or spill-point.

At step 202 of the example algorithm, the matrix of DEM elevation values is represented as X. The algorithm outputs a new matrix D of the same dimensionality as X such that all $D_{ij} \geq X_{ij}$. Elements $D_{ij}=X_{ij}$ if flow can reach the edge of the map from that point. $D_{ij}>X_{ij}$ if that point is part of a sink. The larger the value of $D_{ij}$, the deeper the sink. In an embodiment, the sink filling algorithm takes the matrix of all sinks to be $N=D-X$, and divides N by max(N) to normalize between 0 and 1.

Step 204 of the example algorithm finds the flat areas of the topography from which storm water would take a long time to escape. This step used additional derived slope data from NRCan in conjunction with the DEM. This yielded a matrix S of slope values between 0 and 90. The example algorithm adapted S by converting S to slope percent values (S=S/90); then inverting and linearizing the values such that $S_{ij}=1$ if the slope percent is 0% and $S_{ij}=0$ if the slope percent is ≥2%.

Step 206 of the example algorithm uses a weighted combination to merge N and S. This step used the following weighted combination $Y=0.75 \times N + 0.25 \times S$. This combination resulted in a flood hazard map y that detects new flood hazard areas that were missed by the conventional deterministic algorithm, e.g., map 150 (FIG. 1). The resultant hazard map y is then re-scaled to have values between −1 and 1 for input to GAN modeling.

Various embodiments use a Generative Adversarial Network (GAN) to learn a mapping G: x→y from the DEM, x, to the flood hazard map, y. Given a training set, GAN machine learning generates new data with the same statistics as the training set. GAN incorporates a generative network (also referred to herein as generator) that generates candidates, and a discriminative network (also referred to herein as discriminator or adversarial) that evaluates the candidates. GAN utilizes unsupervised machine learning based on indirect training through the discriminator, which itself is also updated dynamically.

In an embodiment, training the GAN discriminator started with a known dataset as initial training data, and presented the discriminator with samples from the training dataset until it achieved acceptable accuracy. A GAN trained on images generates new images that look at least superficially authentic to human observers, having many realistic characteristics. GAN generator is not trained to minimize the distance to a specific image, but rather to fool the discriminator.

Figure 3:
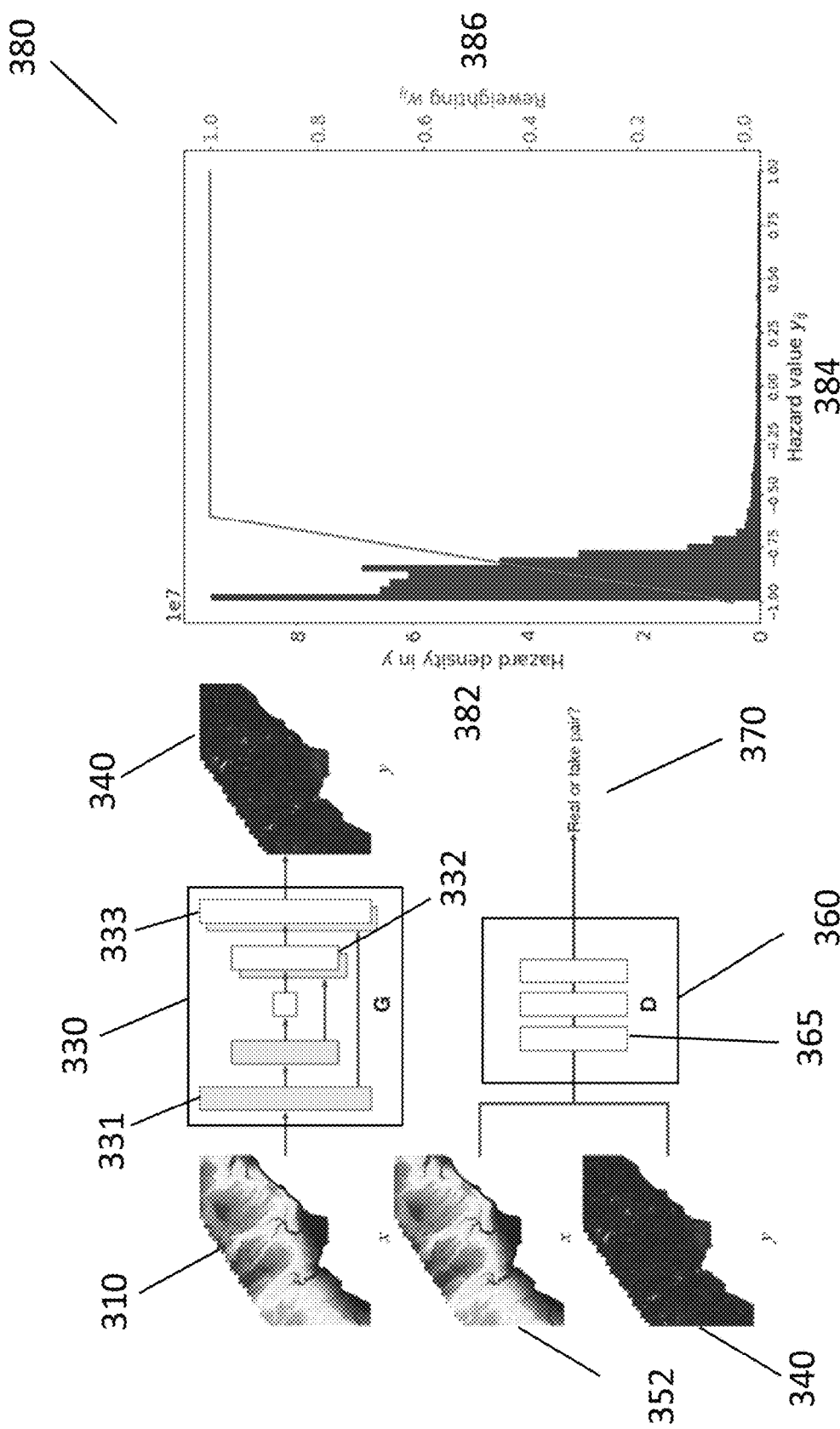
FIG. 3 is a schematic diagram of an architecture of a deep image translation model for flood hazard estimation, showing a graph of hazard distribution with a weighting function for reconstruction loss, according to an embodiment.

FIG. 3 shows at the left side an architecture of flood hazard mapping system 300 for executing a deep image translation model for flood hazard estimation. System 300 applies a machine learning model that is trained using a generative adversarial network to produce an output of a deterministic hazard mapping algorithm. The system 300 stores machine learning models including Generator G 330 and Discriminator D 360, combined in a GAN. The machine learning model is trained to predict a flood hazard map.

The GAN machine learning model is more aggressive than conventional models in investigating potential hazards. The machine learning model generalizes its knowledge onto new regions of the map, finding effects that conventional models do not find. When it sees a region of the original hazard map predicted as high hazard, it tries to learn the patterns and elevations that caused this prediction. When it sees another region that was not predicted as high hazard, it seeks to generalize the contributing factors that caused hazard predictions.

In an embodiment, the generator G incorporates a computer-based system 330 that includes components 331, 332, 333. In this example, components 331, 332, 333 represent neural networks. However, computer-based components can include, for example, analytical engines such as predictive models, internal databases, and input/output modules. In addition, system 300 can communicate with external databases (not shown). Similarly, discriminator D incorporates a computer-based system 360 containing neural networks 365.

Generator G is trained to produce "fake" flood hazard maps that cannot be distinguished from "real" flood hazard maps by an adversarially trained discriminator D. Satellite elevation map 310 is inputted into generator G, which outputs hazard map 340.

Discriminator D is trained to distinguish "real" from "fake" flood hazard maps. A satellite elevation map 352 and the output hazard map 340 of the generator G are inputted into discriminator D, which determines a likelihood that aspects of output hazard map 340 are real or fake (machine-created).

The flood hazard mapping system 300 may be hosted on one or more computers (or servers), and the one or more computers may include or be communicatively coupled to one or more databases including databases of a sponsoring entity and third party databases. The transaction monitoring system 300 can be executed by a server, one or more server computers, authorized client computing devices, smartphones, desktop computers, laptop computers, tablet computers, PDAs, and other types of processor-controlled devices that receive, process, and/or transmit digital data. The system 300 can be implemented using a single-processor system including one processor, or a multi-processor system including any number of suitable processors that may be employed to provide for parallel and/or sequential execution of one or more portions of the techniques described herein. The system 300 performs these operations as a result of central processing unit executing software instructions contained within a computer-readable medium, such as within memory. In one embodiment, the software instructions of the system are read into memory associated with the system 300 from another memory location, such as from a storage device, or from another computing device via communication interface. In this embodiment, the software instructions contained within memory instruct the system 300 to perform processes described below. Alternatively, hardwired circuitry may be used in place of, or in combination with, software instructions to implement the processes described herein. Thus, implementations described herein are not limited to any specific combinations of hardware circuitry and software.

In various embodiments, the flood hazard mapping system 300 extracts information from internal databases, and information from external third party information services. Databases are organized collections of data, stored in non-transitory machine-readable storage. In an embodiment, the databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating, and/or administration of databases. The databases may conform to a well-known structural representational model, such as relational databases, object-oriented databases, and network databases. Database management systems include MySQL, PostgreSQL, SQLite, Microsoft SQL Server, Microsoft Access, Oracle, SAP, dBASE, FoxPro, IBM DB2, LibreOffice Base, and FileMaker Pro. Database management systems also include NoSQL databases, i.e., non-relational or distributed databases that encompass various categories: key-value stores, document databases, wide-column databases, and graph databases.

Systems and methods of the present disclosure model deep image translation using predictive machine learning models. As used herein, the phrase "predictive model" might refer to any class of algorithms that are used to understand relative factors contributing to an outcome, estimate unknown outcomes, discover trends, and/or make other estimations based on a data set of factors collected across prior trials. In an embodiment, the predictive model may refer to methods such as logistic regression, decision trees, neural networks, linear models, and/or Bayesian models.

In an embodiment, the GAN uses an encoder-decoder model generator G based on Pix2pix in conjunction with PatchGAN discriminator D. Because a great deal of low-level information is shared between the input DEM image 310 and output flood hazard map 340, the system 330 incorporates skip connections to shuttle this information directly across the net. The objective of the GAN can be expressed as:

$$\mathcal{L}_{GAN}(G,D) = \mathbb{E}_{x,y \sim P_{data}(x,y)}[\log D(x,y)] + \mathbb{E}_{x \sim P_{data}(x)}[\log(1 - D(x, G(x)))]$$

In the above formula, G tries to minimize the GAN objective against an adversarial D that tries to maximize it.

Since the target of the generator is not only to fool the discriminator, but also to provide an output that is near the ground truth, the present methods adopt a $L_1$ loss function to determine reconstruction loss in training a GAN:

$$\mathcal{L}_{L1}(G) = \mathbb{E}_{x \sim P_{data}(x)}[\|y - G(x)\|_1]$$

The L1 loss function refers to the statistical optimality criterion Least Absolute Deviations (LAD). L1 loss function is used to minimize the error that is the sum of the all the absolute differences between the true value and the predicted value.

Applicants have observed that the number of pixels with hazard and without hazard in the output flood hazard map can be quite imbalanced. To increase the importance of high hazard points, the present method incorporates a reweighted $L_1$ reconstruction loss as:

$$\mathcal{L}_{wL1}(G) = \mathbb{E}_{x \sim P_{data}(x)}[\|w \odot (y - G(x))\|_1]$$

In the above formula, w=2.5y+2.5, clamped between 0.02 and 1.

Graph 380 at FIG. 3 illustrates reweighting to increase the importance of high hazard points. Graph 380 shows a hazard density function, i.e., the probability density function of the distribution of hazard rate. Graph elements in blue show hazard values 384 and hazard density distribution 382 for model predictions. Since most of the region does not have hazard, the model tends to predict all the pixels as non-hazard region when using conventional L1 reconstruction loss. The hazard distribution in red shows the reweighted $L_1$ reconstruction loss function of the present disclosure, $\mathcal{L}_{wL1}$ (G).

In an embodiment, the final objective of the GAN is shown in the following formula, where λ=100 is the weight of the reconstruction loss:

$$G^* = arg\min_G \max_D \mathcal{L}_{GAN}(G, D) + \lambda \mathcal{L}_{wL1}(G)$$

In an illustrative embodiment, the deep image translation procedure chunked over 1024×1024 squares of x and y to train and evaluate the image translation model, allowing for overlap. (The same pixel is present in at most 16 samples). To address image overlap at inference time, image translation modeling experimented with various hazard prediction approaches. These approaches included mean-pooling, which averages the hazard prediction across all overlapping pixels, and max-pooling, which takes the maximum prediction across all overlapping pixels.

TABLE 1 shows test set prediction results across 5-fold cross validation over the GTA map.

TABLE 1

Test Set Prediction Results Aggregated Across Terrain Map

| Model | Pooling | Total MSE | High-hazard MSE | High-hazard Recall |
| --- | --- | --- | --- | --- |
| meanpooling | mean | 19.7 | 132.3 | 0.13 |
| meanpooling - weighted | mean | 20.3 | 126.0 | 0.17 |
| maxpooling | max | 23.1 | 111.8 | 0.33 |
| maxpooling - weighted | max | 28.4 | 100.9 | 0.42 |

Figure 4:
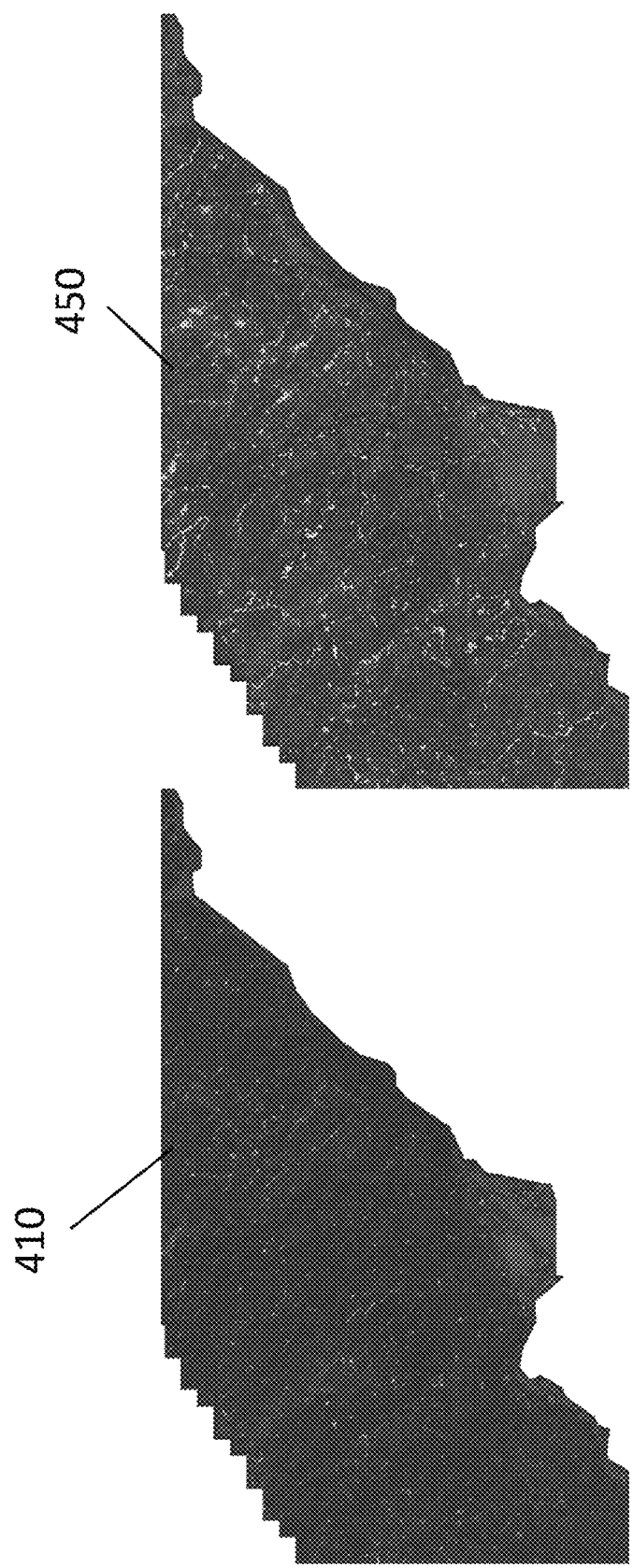
FIG. 4 shows representative views of flood hazard maps predicted by two flood hazard estimation models, including a model with mean-pooling and a weighted model with max-pooling, according to an embodiment.

FIG. 4 and TABLE 1 present the main results of this study. To assess model generalization, model training employed 5-fold cross validation over x and y, separating out contiguous regions for training and test. Modeling employed aggregate test set results for each fold to obtain the final results. Three metrics for evaluation were employed, in which model predictions and target y were first mapped to 8-bit integer space. The first metric was total MSE, the mean squared error for reconstructing the deterministically produced hazard map (map 150, FIG. 1). Predictive modeling separately evaluated model performance on the high hazard areas (pixels where $y_{ij} \geq 100$) with high-hazard MSE since the total MSE may be misleading due to limitations of the deterministic algorithm. Another metric evaluated high hazard prediction as a pixel-level classification problem, calculating high-hazard recall. Predictive modeling evaluated recall and not precision because the deterministic algorithm can easily miss real hazardous regions, while it is likely correct for the high hazard regions it does detect.

Using mean-pooling for overlapping image predictions is more conservative than max-pooling when predicting hazard. Second, the weighting mechanism improves the ability of the model to predict high hazard regions. Combining this weighting mechanism with max-pooling obtains very favorable results for high-hazard MSE and recall. Graph 380, FIG. 3 illustrates the difference. The present method is much more confident when predicting high hazard regions than the conventional approach, which is conservative.

Figure 6:
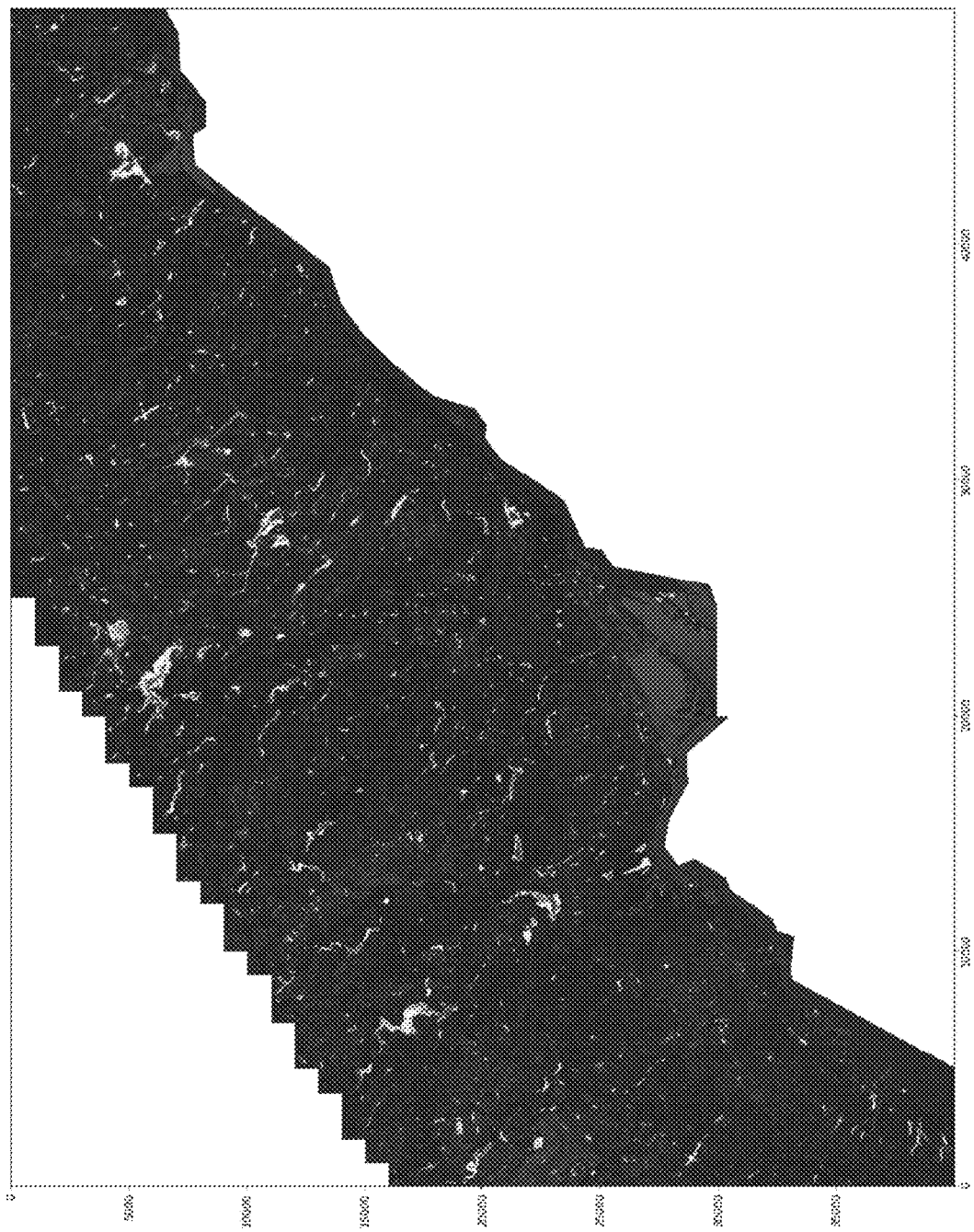
FIG. 6 is a representative view of a flood hazard map predicted by a deterministic flood hazard mapping algorithm applied to test set data of a DEM, according to an embodiment.
Figure 7:
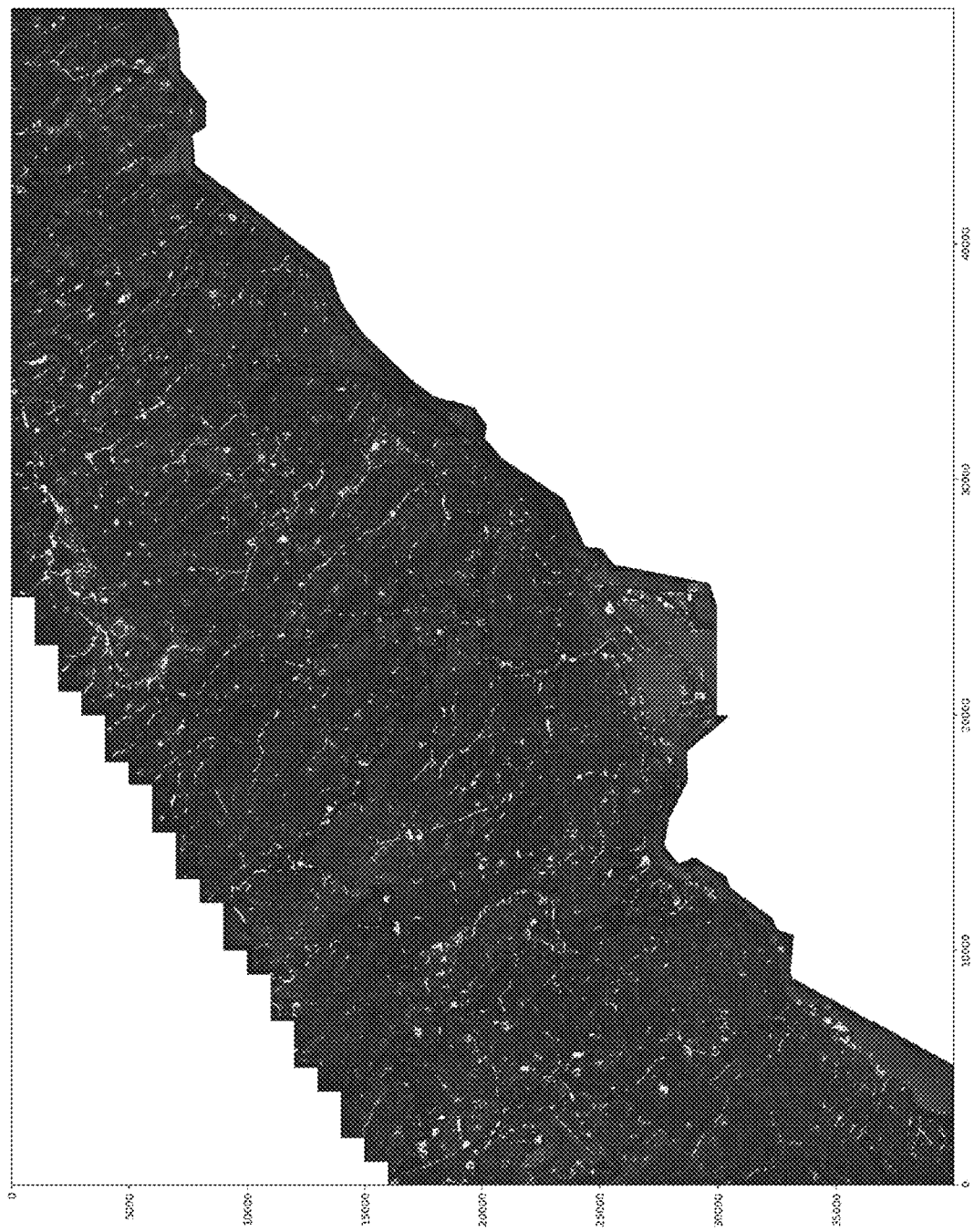
FIG. 7 is a representative view of a flood hazard map predicted by a Generative Adversarial Network (GAN) maxpooling flood hazard mapping algorithm applied to test set data of a DEM, according to an embodiment.
Figure 8:
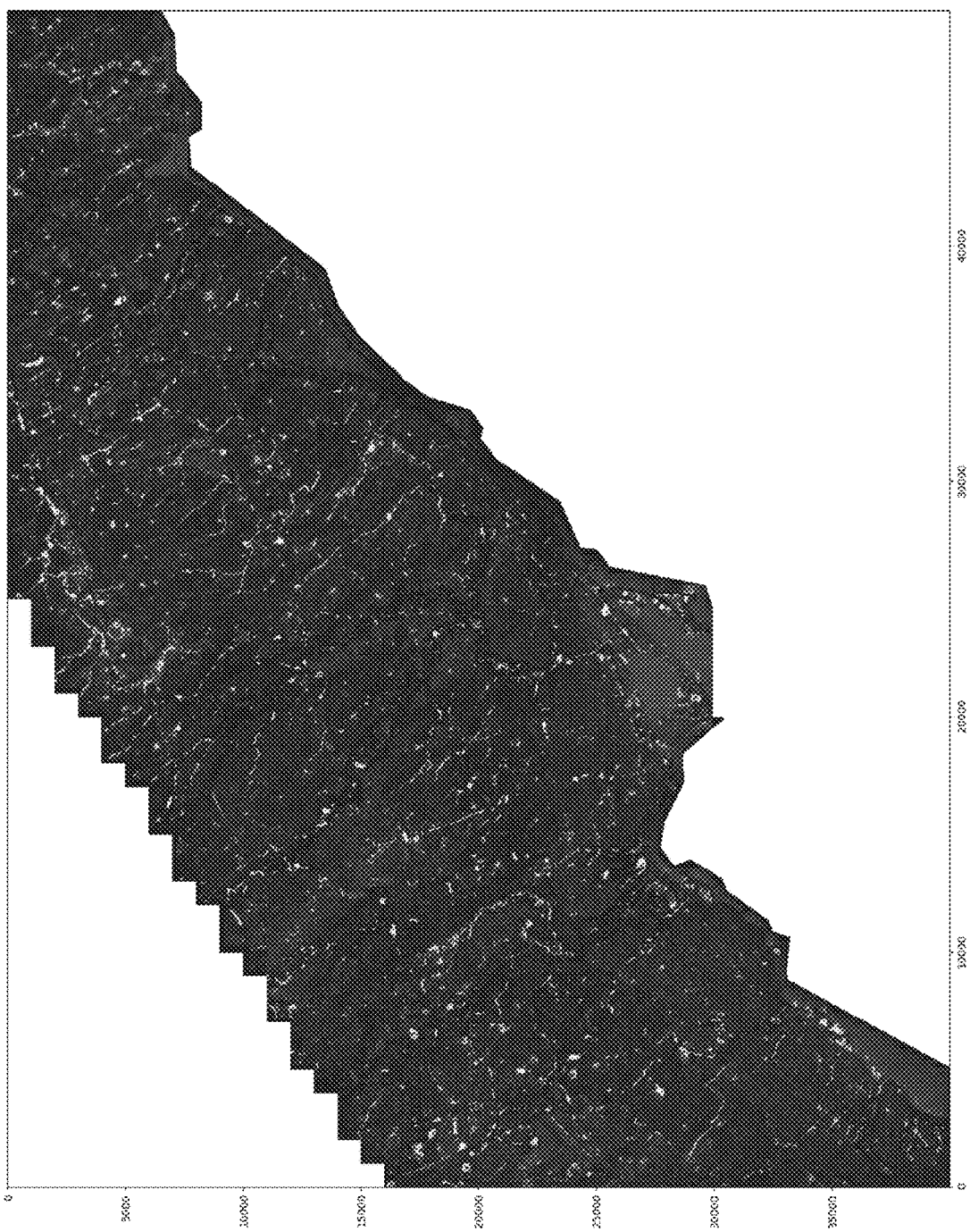
FIG. 8 is a representative view of a flood hazard map predicted by a GAN meanpooling flood hazard mapping algorithm applied to test set data of a DEM, according to an embodiment.
Figure 9:
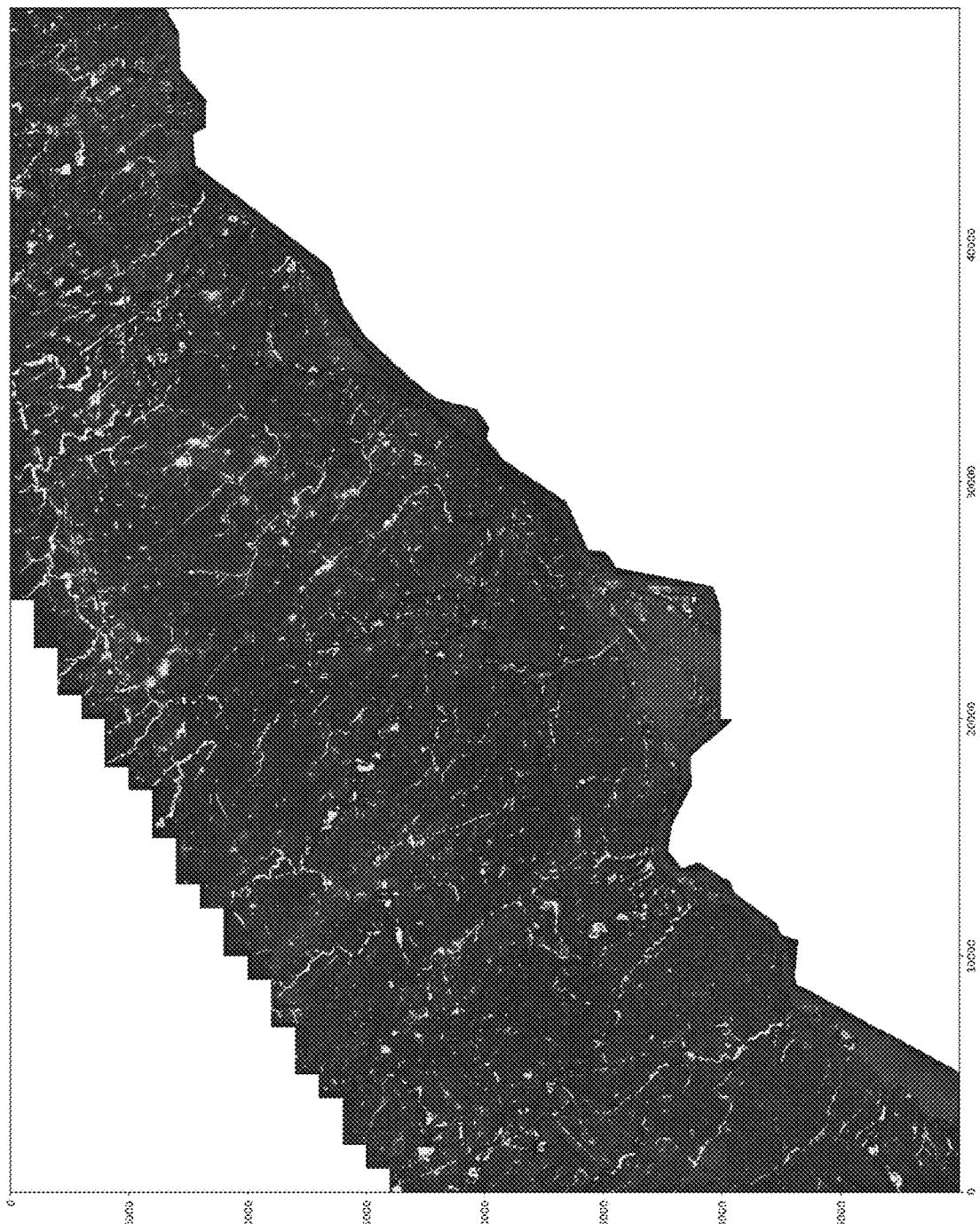
FIG. 9 is a representative view of a flood hazard map predicted by a GAN weighted maxpooling flood hazard mapping algorithm applied to test set data of a DEM, according to an embodiment.
Figure 10:
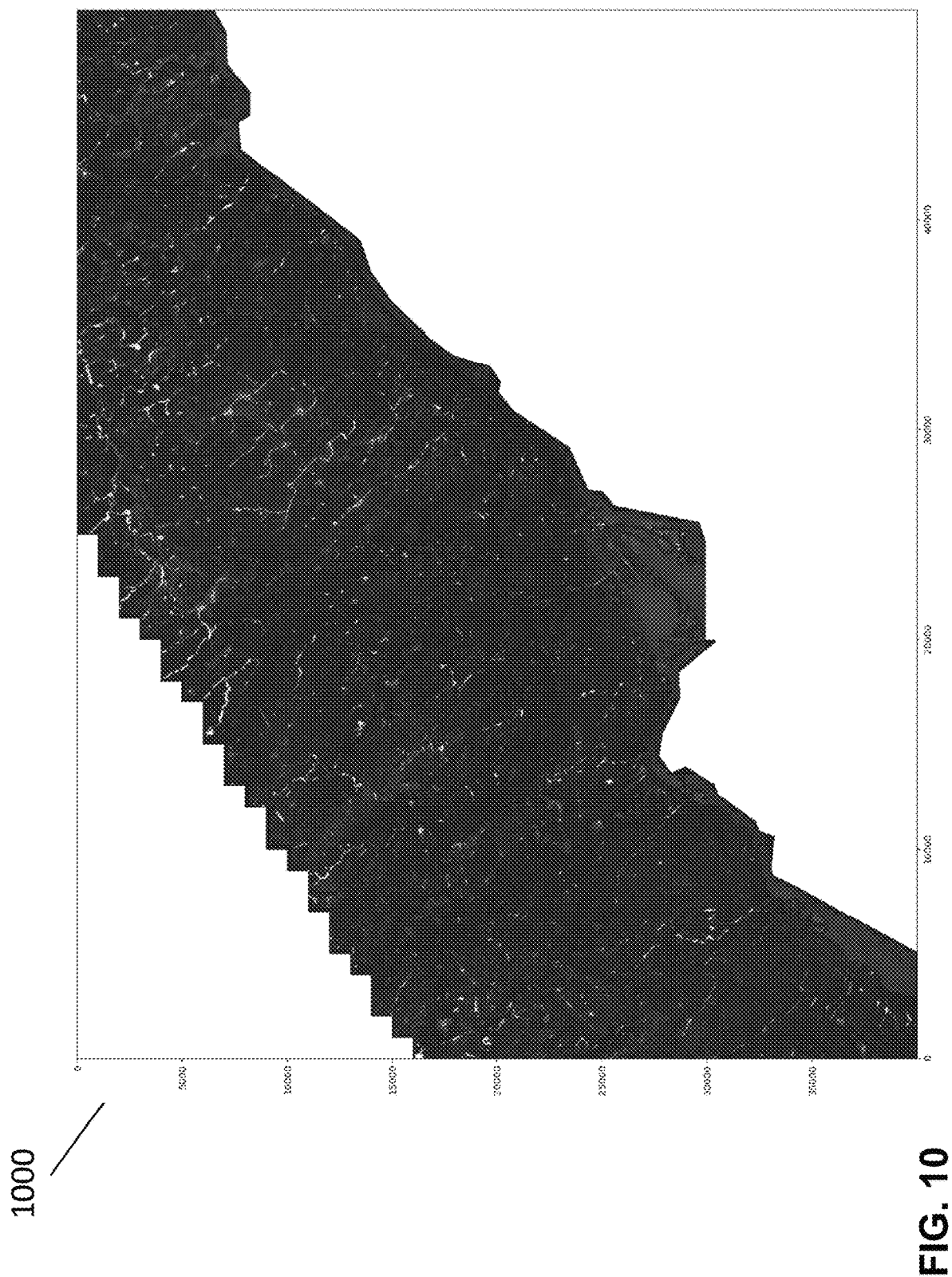
FIG. 10 is a representative view of a flood hazard map predicted by a GAN weighted meanpooling flood hazard mapping algorithm applied to test set data of a DEM, according to an embodiment.

Illustrative flood hazard maps based on various modeling approaches applied to a test set data of a DEM for GRT are shown in FIGS. 6-10. FIG. 6 shows a flood hazard map predicted by a deterministic flood hazard mapping algorithm. FIG. 7 shows a flood hazard map predicted by a GAN maxpooling flood hazard mapping algorithm. FIG. 8 shows a flood hazard map predicted by a GAN meanpooling flood hazard mapping algorithm. FIG. 9 shows a flood hazard map predicted by a GAN weighted maxpooling flood hazard mapping algorithm. FIG. 10 shows a flood hazard map predicted by a GAN weighted meanpooling flood hazard mapping algorithm.

In evaluating disclosed embodiments using deep image translation techniques, illustrative study data uses recent Canadian LIDAR satellite data to train the model to predict the output of a deterministic flood hazard mapping algorithm. Comparison between the deterministically produced hazard map and the model's predicted hazard map indicate this technique may detect new regions vulnerable to flooding that would otherwise have been missed. The introduction of a weighting mechanism into the reconstruction loss of the model considerably improves model's ability to detect high hazard regions.

Foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as addition, the order of the operations may be rearranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage, or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
inputting, by a computer, a satellite elevation map;
applying, by the computer, a machine learning model that is trained using a generative adversarial network to output a deterministic hazard mapping algorithm;
applying, by the computer, the generative adversarial network using the outputted deterministic hazard mapping algorithm to generate, based on a mapping from the satellite elevation map, a map representing flood hazard areas that are vulnerable to flooding; and
outputting, by the computer, the map representing the flood hazard areas.

2. The method of claim 1, wherein the generative adversarial network comprises a deep learning convolutional neural network trained to abstract the satellite elevation map to a flooding-related feature map.

3. The method of claim 1, wherein the map representing flood hazard areas identifies geographic areas most vulnerable to pluvial flooding.

4. The method of claim 1, wherein the generative adversarial network includes an objective function, wherein in training the machine learning model a generator of the generative adversarial network tries to minimize the objective function against an adversarial of the generative adversarial network that tries to maximize the objective function.

5. The method of claim 4, wherein the objective function of the generative adversarial network includes a reconstruction loss with a weighting mechanism that increases importance of high hazard areas.

6. The method of claim 5, wherein the reconstruction loss comprises an L1 loss function, reweighted to increase the importance of the high hazard areas.

7. The method of claim 6, wherein the L1 loss function is reweighted via the weighting factor $w=2.5y+2.5$, clamped between 0.02 and 1.

8. The method of claim 1, wherein the generative adversarial network comprises a deep learning neural network, wherein the satellite elevation map is a digital elevation model (DEM) topography representing elevation data of an identified terrain, wherein the deep learning neural network applies the deterministic hazard mapping algorithm to the DEM topography to detect and fill sinks in the DEM topography.

9. The method of claim 8, wherein the deep learning neural network further applies the deterministic hazard mapping algorithm to subtract the elevation data of the DEM topography to generate a hidden layer representing a filled topography map and to identify flattest regions of the hidden layer representing the filled topography map.

10. The method of claim 9, wherein the deep learning neural network further applies the deterministic hazard mapping algorithm in an output layer of the deep learning neural network merging the hidden layer representing the filled topography map and the DEM topography representing the elevation data of the identified terrain.

11. The method of claim 10, wherein the merging the hidden layer representing the filled topography map and the DEM topography generates a weighted combination of the filled topography map and the DEM topography balancing the identified flattest regions of the filled topography map versus the detected sinks in the DEM topography.

12. A computer-implemented method comprising:
retrieving, by the computer, a digital elevation model (DEM) topography file representing elevation data of an identified terrain;
applying a sink-filling algorithm to the DEM topography file, wherein the sink-filling algorithm detects and fills sinks in the DEM topography file;
subtracting the elevation data of the DEM topography file to generate a filled topography file;
analyzing, by the computer, the filled topography file to identify flattest regions of the filled topography file; and
generating, by the computer, a flood hazard map file by applying a weighting function in merging the filled topography file and the DEM elevation data, wherein the weighting function balances the detected sinks in the DEM elevation data and the flattest regions of the filled topography file.

13. A system comprising:
a server comprising a processor and a non-transitory computer-readable medium containing instructions that when executed by the processor causes the processor to perform operations comprising:

input a satellite elevation map;
apply a machine learning model this is trained using a generative adversarial network to output a deterministic hazard mapping algorithm;
apply the generative adversarial network using the outputted deterministic hazard mapping algorithm to generate, based on a mapping from the satellite elevation map, a map representing flood hazard areas that are vulnerable to flooding; and
output a map representing flood hazard areas.

14. The system of claim 13, wherein the generative adversarial network includes an objective function, wherein in training the machine learning model a generator of the generative adversarial network tries to minimize the objective function against an adversarial of the generative adversarial network that tries to maximize the objective function.

15. The system of claim 14, wherein the objective function of the generative adversarial network includes a reconstruction loss with a weighting mechanism that increases importance of high hazard areas.

16. The system of claim 15, wherein the reconstruction loss comprises an L1 loss function, reweighted to increase the importance of the high hazard areas.

17. The system of claim 13, wherein the generative adversarial network comprises a deep learning neural network, wherein the satellite elevation map is a digital elevation model (DEM) topography representing elevation data of an identified terrain, wherein the deep learning neural network applies the deterministic hazard mapping algorithm to the DEM topography to detect and fill sinks in the DEM topography.

18. The system of claim 17, wherein the deep learning neural network further applies the deterministic hazard mapping algorithm to subtract the elevation data of the DEM topography to generate a hidden layer representing a filled topography map and to identify flattest regions of the hidden layer representing the filled topography map.

19. The system of claim 18, wherein the deep learning neural network further applies the deterministic hazard mapping algorithm in an output layer of the deep learning neural network merging the hidden layer representing the filled topography map and the DEM topography representing the elevation data of the identified terrain.

20. The method of claim 19, wherein the merging the hidden layer representing the filled topography map and the DEM topography generates a weighted combination of the filled topography map and the DEM topography balancing the identified flattest regions of the filled topography map versus the detected sinks in the DEM topography.

* * * * *